(12) United States Patent  
Bergman et al.

(10) Patent No.: US 6,925,453 B1  
(45) Date of Patent: Aug. 2, 2005

(54) METHODS AND APPARATUS FOR DISTRIBUTED RESOURCE DISCOVERY USING EXAMPLES

(75) Inventors: Lawrence David Bergman, Mount Kisco, NY (US); Vittorio Castelli, White Plains, NY (US); Yuan-Chi Chang, White Plains, NY (US); Matthew L. Hill, Yonkers, NY (US); Chung-Sheng Li, Ossining, NY (US); John Richard Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 09/614,141

(22) Filed: Jul. 13, 2000

(51) Int. Cl.$^7$ ............................................. G06F 15/18
(52) U.S. Cl. ...................................................... 706/20
(58) Field of Search ......................................... 706/20

(56) References Cited

U.S. PATENT DOCUMENTS

| | | | |
|---|---|---|---|
| 6,092,059 A | * | 7/2000 | Straforini et al. ............. 706/14 |
| 6,389,436 B1 | * | 5/2002 | Chakrabarti et al. ........ 715/513 |
| 6,513,027 B1 | * | 1/2003 | Powers et al. ................. 706/47 |

OTHER PUBLICATIONS

K. Rose, et al., "Entropy-Constrained Tree-Structured Vector Quantizer Design," IEEE Transactions on Image Processing, vol. 5, No. 2, pp. 393-398, Feb. 1996.

C. Chinrungrueng et al., "Optimal Adaptive K-Means Algorithm with Dynamic Adjustment of Learning Rate," IEEE Transactions on Neural Networks, vol. 6, No. 1, pp. 157-169, Jan. 1995.

L. Kaufman et al., "Finding Groups in Data: An Introduction to Cluster Analysis," John Wiley & Sons, Chapter 3, pp. 37-50, 1990.

P.K. Simpson, "Artificial Neural Systems: Foundations, Paradigms, Applications, and Implementations," Neural Networks: Research and Applications, Pergamon Press, Chapter 3, pp. 7-22, 1990.

L. Breiman et al, "Classification and Regression Trees," Construction of Trees from a Learning from a Learning Sample, Wadsworth & Brooks/Cole Advanced Books & Software, Chapter 11, pp. 297-306, Pacific Grove, CA, 1984.

Y. Linde, et al., "An Algorithm for Vector Quantizer Design," IEEE Transactions on Communications, vol. Com-28, No. 1, pp. 84-95, Jan. 1980.

R.O. Duda et al., "Pattern Classification and Scene Analysis," Bayes Decision Theory, John Wiley & Sons, Chapter 2, pp. 10-20, Menlo Park, California, 1973.

* cited by examiner

Primary Examiner—Anthony Knight  
Assistant Examiner—Michael B. Holmes  
(74) Attorney, Agent, or Firm—Ryan, Mason & Lewis, LLP (57) ABSTRACT

Distributed resource discovery is an essential step for information retrieval and/or providing information services. This step is usually used for determining the location of an information or data repository which has relevant information. The most fundamental challenge is the usual lack of semantic interoperability of the requested resource. In accordance with the invention, a method is disclosed where distributed repositories achieve semantic interoperability through the exchange of examples and, optionally, classifiers. The outcome of the inventive method can be used to determine whether common labels are referring to the same semantic meaning.

18 Claims, 12 Drawing Sheets

(A) QUERY EXAMPLES CROSS-CLASSIFIED USING REPOSITORY CLASSIFIER

| INPUT LABEL | OUTPUT LABEL | SCORE |
|---|---|---|
| FOREST | WOODS | .95 |
| FOREST | FIELD | .04 |
| FOREST | LAKE | .01 |
| FOREST | WOODS | .83 |
| FOREST | FIELD | .14 |
| FOREST | LAKE | .03 |
| WATER | WOODS | .10 |
| WATER | FIELD | .01 |
| WATER | LAKE | .89 |

EXAMPLE 1 1601 (rows 1–3)
EXAMPLE 2 1602 (rows 4–6)
EXAMPLE 3 1603 (rows 7–9)

(B) REPOSITORY EXAMPLES CROSS-CLASSIFIED USING QUERY CLASSIFIER

| INPUT LABEL | OUTPUT LABEL | SCORE |
|---|---|---|
| WOODS | FOREST | .97 |
| WOODS | WATER | .03 |
| WOODS | FOREST | .89 |
| WOODS | WATER | .11 |
| FIELD | FOREST | .67 |
| FIELD | WATER | .33 |
| LAKE | FOREST | .05 |
| LAKE | WATER | .95 |

EXAMPLE 1 1604 (rows 1–2)
EXAMPLE 2 1605 (rows 3–4)
EXAMPLE 3 1606 (rows 5–6)
EXAMPLE 4 1607 (rows 7–8)

1901 — GENERATE RULES FROM REPOSITORY VOCABULARY R TO QUERY VOCABULARY Q USING MATRIX 1

1902 — GENERATE RULES FROM QUERY VOCABULARY Q TO REPOSITORY VOCABULARY R USING MATRIX 2

1903 — COMPUTE ASSOCIATION RULE CONFIDENCE (i, J) = CONFIDENCE (i → J) * CONFIDENCE (J → i)

1904 — PRUNING OF LOW CONFIDENCE RULES

FIG. 20

MATRIX 1 (R → Q)

|   | A | B |
|---|---|---|
| 1 | 0.75 | 0.15 |
| 2 | 0.35 | 0.25 |
| 3 | 0.25 | 0.65 |

MATRIX 2 (Q → R)

|   | 1 | 2 | 3 |
|---|---|---|---|
| A | 0.65 | 0.15 | 0.10 |
| B | 0.15 | 0.25 | 0.6 |

| (1,A) | 0.75*0.65 | 0.4875 |
| (1,B) | 0.15*0.15 | 0.0225 |
| (2,A) | 0.35*0.15 | 0.0525 |
| (2,B) | 0.25*0.25 | 0.0625 |
| (3,A) | 0.25*0.1  | 0.025  |
| (3,B) | 0.65*0.6  | 0.39   |

FIG. 21

MEMORY — 2110

PROCESSOR — 2100

I/O DEVICES — 2120

METHODS AND APPARATUS FOR DISTRIBUTED RESOURCE DISCOVERY USING EXAMPLES

This invention was made with Government support under contract no. NCC5-305 awarded by NASA. The U.S. Government has certain rights to this invention as provided for by the terms of the contract.

FIELD OF THE INVENTION

The present invention relates generally to distributed database systems and, more particularly, to discovering resources in a heterogeneous environment of distributed information repositories.

BACKGROUND OF THE INVENTION

Interoperability between database systems, and other forms of information repositories, is becoming an increasingly important area of development. The goal is to allow a single query to access distributed, often heterogeneous data sources and search engines. An example is web meta-search engines (such as meta-seek) that can access a variety of search engines (such as altavista or lycos), and return a single set of integrated results. Another example is directories for earth-science data, such as the Global Change Master Directory, which allows access to a variety of science data distributed at various sites through a single query interface.

Resource discovery is a term that is used to describe the process of determining the nature of entities that are contained within an information repository. When queries are being processed by multiple, heterogeneous repositories, an important step of the process is determining what information is available from each repository. For example, a query that seeks to find areas of deforestation in the Amazon basin between 1995 and the present would need to determine whether a given repository contains appropriate data which might include (in increasing order of specificity): determining if the repository is oriented towards earth sciences; if it contains deforestation information; if the information covers the Amazon basin; if the requested dates are available.

Search interoperability is generally implemented in one of two ways. The first is to define a common set of terms (ontology), and require that repositories that are to interoperate all employ the common ontology. This is feasible in well-established domains such as medicine or particle physics. The other possibility is to build translators to create mappings between a local set of terms within a repository, and a common set of terms used in formulating queries. This allows for local "dialects," as long as the underlying semantic entities in the repository correspond to those expressed in the query.

A much harder resource discovery problem, and one that has not been adequately addressed to date, is how to determine whether the entities in a repository have the same semantics as those being requested by a query. The entities in the repository may have different labels than those used in the query or they may have the same labels, but not the same meaning. For example, a query with the term "deciduous forest" may be adequately addressed by a repository that has entities labeled "hardwood," yet it may be quite difficult to determine this correspondence. On the other hand, two different repositories may have the term "temperature," but one may be daily maximum temperature, the other may be hourly mean temperature, and thus not correspond. It is important to be able to determine whether entities with different or identical labels actually refer to the same underlying semantic concept.

The present invention addresses a particular class of such problems—where the entities in the query and the entities in the repository are both defined in terms of a set of classes produced by supervised classifiers. In many application areas, application data is categorized using classifiers. Examples of categorization include: assigning labels of "fraudulent" and "non-fraudulent" to medical claims records, determining land cover categories such as "forest" or "water" for each region in a satellite image, or assigning a category to a news item for access by a web search engine. As can be seen in the last example, the categorization need not be a simple "flat" scheme—it may be hierarchical, or even overlapping.

Classifiers are automated procedures that take input data, and produce the appropriate categorization for each item. Medical records may be input to a classifier which will output the appropriate designation of "fraudulent" or "non-fraudulent" based on the values of individual fields in the record. Similarly, the spectral reflectance values of each individual pixel in a satellite image may be used by a land cover classifier to determine the most likely class for that pixel. The frequency and arrangement of words in a news item may be input to a news article classifier, which will produce a single category label, or a set of appropriate labels.

Classifiers may be broadly divided into two main types: unsupervised or supervised. Unsupervised classifiers assign the input data to categories or classes using techniques such as clustering; the result is an arbitrary label (e.g., a cluster number) assigned to each category. In other words, the label assigned by an unsupervised classifier does not contain semantic information. Examples of unsupervised classifiers (as described, for example, in C. H. Chen et al., "Finding Groups in Data," World Scientific, New York, 1993) include the modified Lloyd algorithm (as described, for example, in Y. Linde et al., "An Algorithm for Vector Quantizer Design," IEEE Trans. Communications, 28(1), pp. 84–95, January 1980), the tree-structured vector quantizers (as described, for example, in K. Rose et al., "Entropy-Constrained Tree-Structured Vector Quantizer Design," IEEE Trans. Image Processing, 5(2):393–398, February 1996), and k-means (as described, for example, in C. Chinrungrueng et al., "Optimal Adaptive K-means Algorithm with Dynamic Adjustment of Learning Rate," IEEE Transactions on Neural Networks, 6(1), pp. 157–169, January 1995). Supervised classifiers, on the other hand, use a set of examples, known as training sets that are considered typical of each class, and use these examples to "train" the algorithm that does the categorization. Different training sets produce different categorizations. A supervised classifier then should be considered to comprise a classification algorithm and a training set. Types of supervised classifier algorithms include the Bayes Classifier, the Perceptron, the k-nearest-neighbor, linear discriminant functions (all described, for example, in R. O. Duda et al., "Pattern Classification and Scene Analysis," John Wiley & Sons, 1973), CART (as described, for example, in L. Breiman et al., "Classification and Regression Trees," Wadsworth & Brooks/Cole, 1984) and Neural networks (as described, for example, in P. K. Simpson, "Artificial Neural Systems, Foundations, Paradigms, Applications and Implementations," Pergamon Press, 1990).

SUMMARY OF THE INVENTION

The present invention is directed to evaluation of semantic similarity between entities stored in an information repository and those being requested by a query, where entities are defined in terms of sets of class labels produced by supervised classifiers. Specifically, the present invention provides methods and apparatus for performing such evaluation employing a cross-classification methodology.

It is assumed that a query contains a set of definitions of classes to be searched. Each such definition comprises a set of training data (examples) and a classifier. Similarly, it is assumed that the repository contains a trained classifier, with training data and associated labels available.

In an illustrative aspect of the invention, a method of evaluating semantic similarity between entities stored in a repository and entities being requested in a query comprises determining similarity between each class defined in the query and each class defined in the repository. The question to be answered is: how well does class A from the query correspond to class X in the repository? This is accomplished by providing the training set from the query as input to the trained repository classifier, and providing the training set from the repository as input to the trained query classifier. The two sets of output labels, with associated scores, are input to a module (such as, for example, a fuzzy logic inference engine) which reconciles the two sets, and outputs a ranking score for each query class/repository class combination. The symmetric classification operations are referred to herein as cross-classification.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of some illustrative resource discovery applications. However, it is to be understood that the present invention is not limited to any particular resource discovery applications. Rather, the invention is more generally applicable to any resource discovery application in which it is desirable to provide an evaluation of how well a particular class from a query corresponds to a particular class in a search repository. It is also to be appreciated the terms "class," "label," and "examples," as used herein according to the invention, are defined as follows: (i) each "class" is a semantically distinguishable group of features; (ii) a "label" is the denotation for this group; and (iii) "examples" are taken from the members of the group. Also, the term "distributed," as used herein according to the invention, refers to the fact that there are multiple information repositories involved in the resource discovery operation which may likely be on more than one computer system but which may, nonetheless, reside on a single computer.

Figure 1:
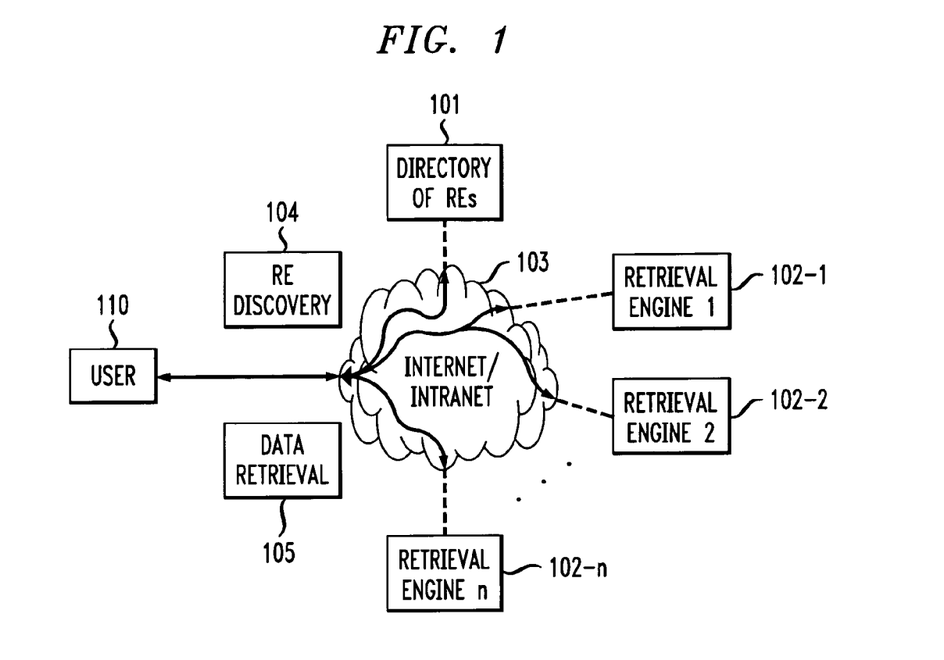
FIG. 1 is a graphical illustration of the distributed resource discovery scenario.

Referring now to FIG. 1, a distributed resource discovery scenario is illustrated. As shown, a user 110 requests one or more resources, e.g., web pages, images, documents, etc., through a network 103. It is to be appreciated that the network may be the Internet, an Intranet, and/or some other suitable network. The type of network is not critical to the invention. Usually, the resources are requested in two stages. In the first stage, the available retrieval engines are located from a retrieval engine (RE) directory 101 coupled to the network. From this directory, the locations of the retrieval engines 102-1 through 102-n, coupled to the network, are located. This stage is the RE discovery (retrieval engine discovery) process 104. In the second stage, once the retrieval engines are located, the data query is sent to those retrieval engines which may have the resources. The retrieved results are then sent back to the user. This stage is the data retrieval process 105.

Figure 2:
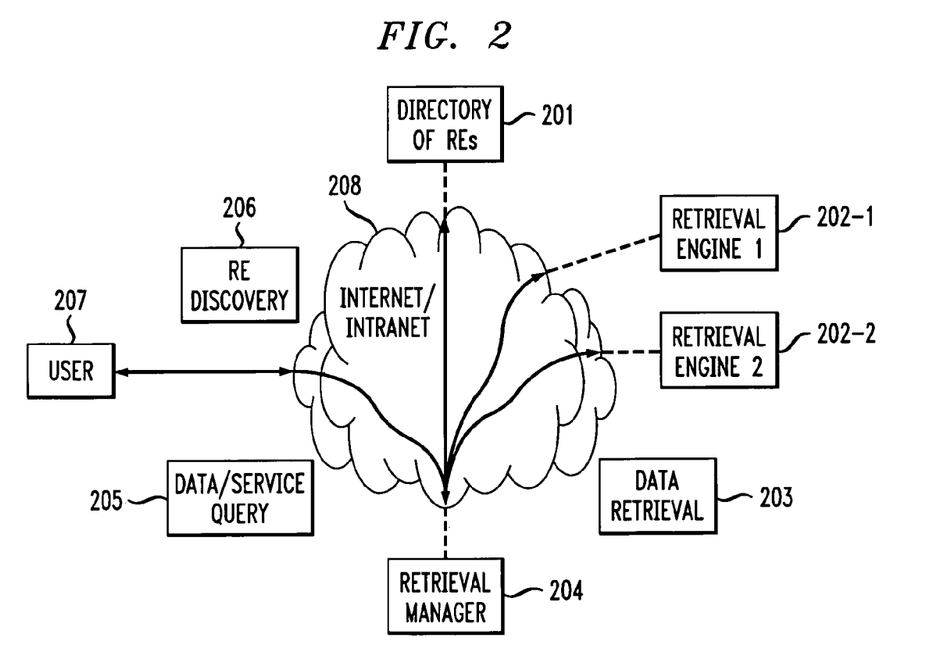
FIG. 2 is a graphical illustration of the centralized resource discovery scenario.

A slightly different scenario is illustrated in FIG. 2, in which a centralized retrieval manager 204, coupled to the network 208 (similar to network 103), is acting on behalf of the user 207 to request the resource for a data or service query 205.

Consequently, the user 207 first makes the data retrieval request 203 of the resource to the retrieval manager 204. The retrieval manager either has the locations of all the retrieval engines locally, or coordinates with one or more of the retrieval engine directories 201, coupled to the network, to inquire about all the retrieval engines 202-1, 202-2 . . . , coupled to the network. The retrieval engine discovery process 206 is much more simplified than the distributed discovery process of FIG. 1 due to the centralized retrieval manager.

Figure 3:
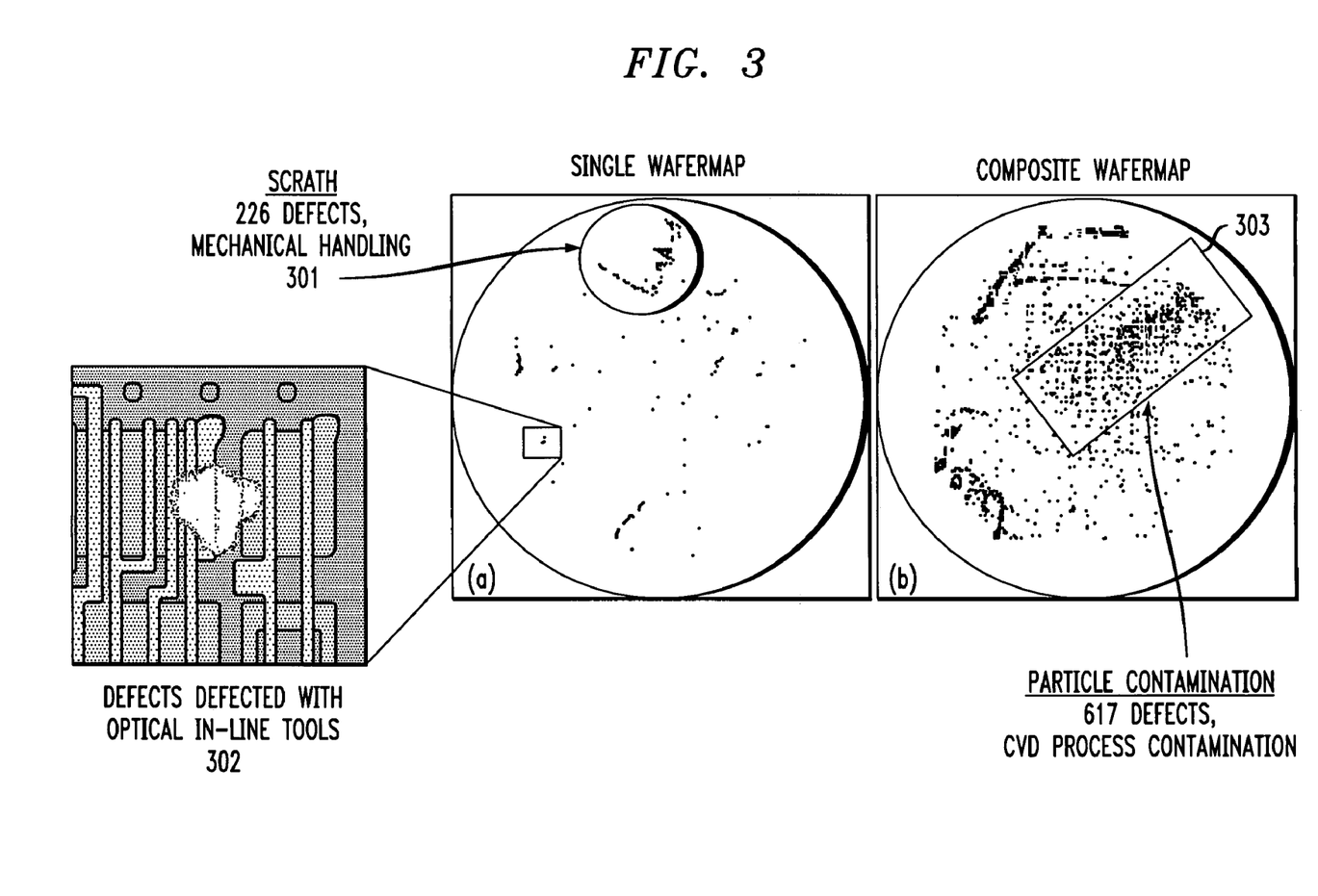
FIG. 3 shows an example of IC defect description through the use of examples.

Referring now to FIG. 3, an example of an integrated circuit (IC) defect description, depicted therein, shows why resource discovery is usually difficult if the vocabulary, terminology, or labels are not unified and standardized. A single wafermap is shown in FIG. 3 in the box labeled (a). There is a region 301 which has 226 defects due to scratches that happened during mechanical handling. One of the defects, shown as a blownup image in 302, was detected with optical in-line tools. Other sources of defects are shown in FIG. 3 in the box labeled (b). In particular, the square region 303 shows 617 defects due to chemical vapor deposition (CVD) contamination. Unfortunately for resource discovery applications, these defects can be referred to by different manufactures using completely or slightly different terminology.

Figure 4:
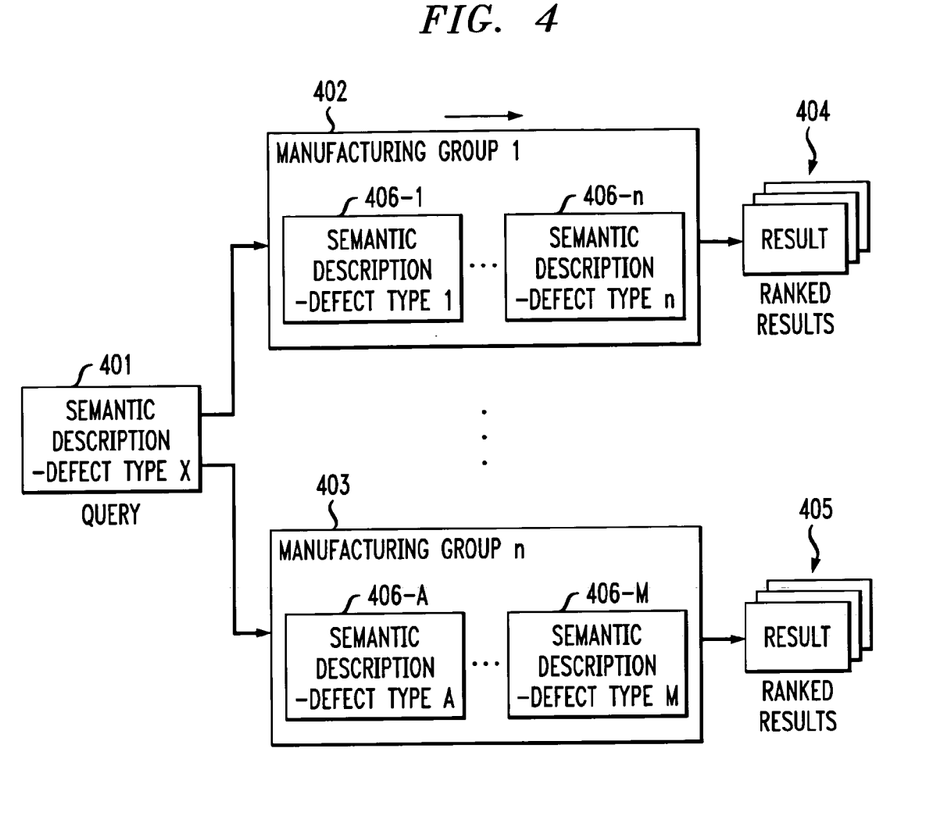
FIG. 4 illustrates a scenario in which the description of IC defects is sent to multiple manufacturing groups in order to retrieve other similar defects.

FIG. 4 illustrates such a scenario in which a query, which describes the semantics of IC defects 401, is sent to multiple repositories 402 and 403. Each of the repositories may have a number of descriptions of the defects, e.g., 406-1 through 406-n stored in the repository 402, and 406-A through 406-M stored in the repository 403. The objective is to identify those repositories which store similar defect descriptions, and retrieve those defect results 404 and 405. As is evident from FIGS. 3 and 4, because each repository may include different semantic descriptions of the IC defect type, optimum resource discovery in response to a query is difficult to achieve.

Figure 5:
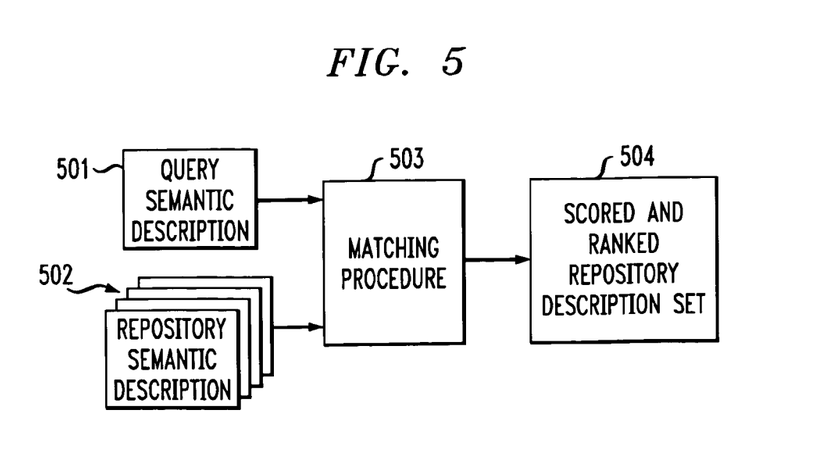
FIG. 5 shows a scenario in which a query is submitted to multiple catalogs.

FIG. 5 illustrates an e-commerce scenario in which the person who is interested in browsing the catalog provides a semantic description 501 of what he/she is interested in. This description will be used to search multiple catalogs (repositories) to locate the desirable items (scored and ranked repository description set) 504 through a semantic description matching procedure 503 which attempts to match semantic descriptions 502 from the catalogs with the query semantic description 501. Some existing websites, such as PriceScan (www.pricescan.com), PriceWatch (www.pricewatch.com), Killerapp (www.killerapp.com), and BidFinder (www.bidfinder.com) offer multiple catalog searches based on text strings. However, an exact match of text (such as a description "IBM Thinkpad 600") is required in order to locate the desirable item.

Figure 6:
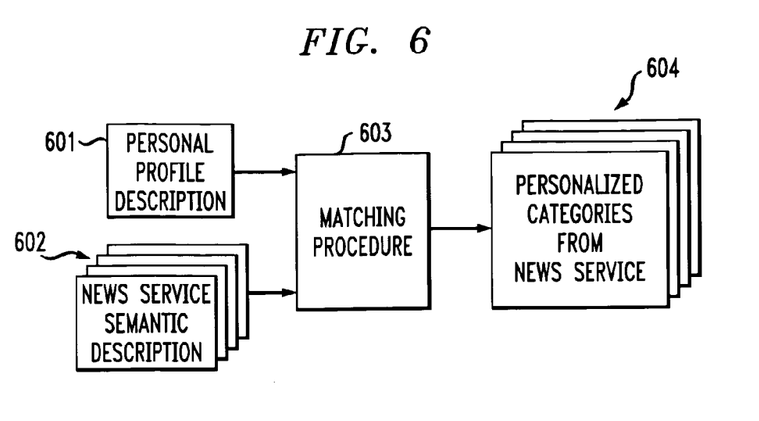
FIG. 6 shows a scenario in which a personal profile is described through examples and is used for subscribing multiple news services.

FIG. 6 illustrates a personalization scenario in which a person wishes to subscribe to a number of news services. In general, a desirable scenario would be for a personal profile description 601 to be provided to multiple news service agencies so that a customization (matching) procedure 603 of the news services can be automatically accomplished using news service semantic descriptions 602. The customization procedure generates personalized news services 604 for the user. However, each of the news services may have different ontology (or categorization) of their available news items. Consequently, it is not possible to perform such automatic customization in accordance with existing resource discovery methods.

Figure 7:
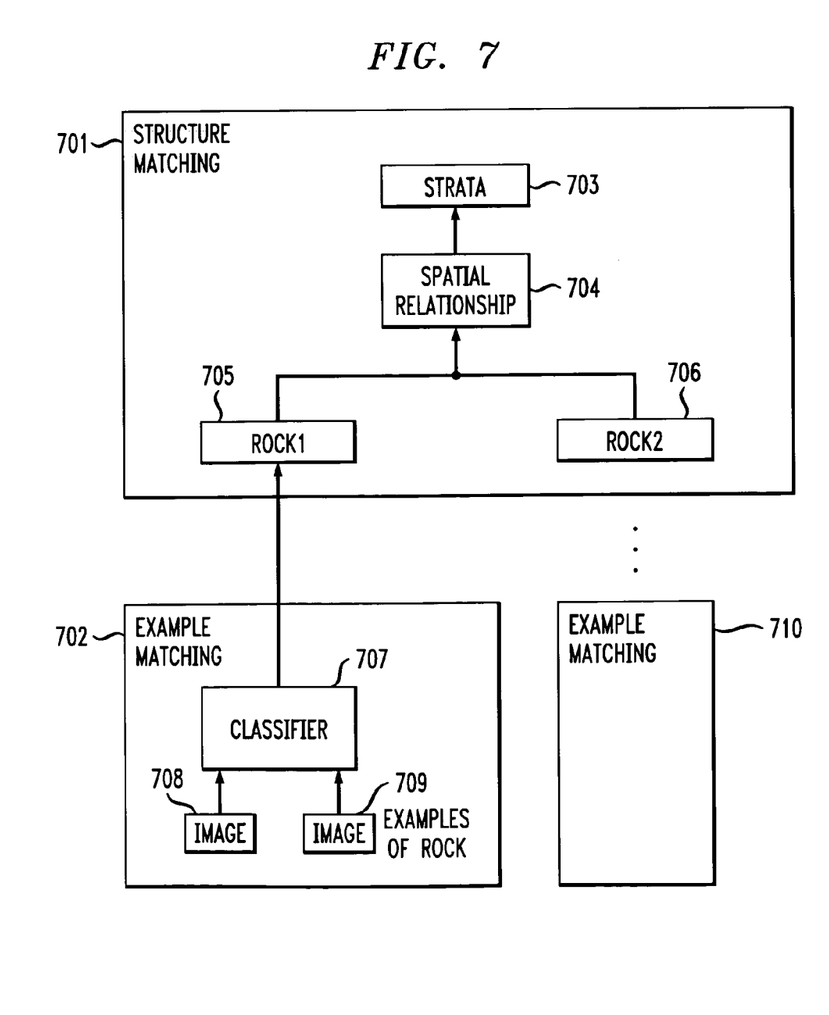
FIG. 7 shows a scenario related to how semantic matching through examples according to the invention can be used in conjunction with structure matching.

Note that it is possible to construct a high-level semantic description from a low-level semantic description using spatial, temporal and boolean operators, as shown in FIG. 7. For example, strata 703 usually consists of multiple layers of rocks, with one rock 705 sitting on top of another rock 706. The spatial relationship 704 between these rocks is thus considered to be: "on top of." Each basic rock type (such as shale, sandstone, or siltstone) needs to be described. Consequently, in accordance with the invention, a method for automatic discovery of label association (to be described below) can be used to define the basic rock type. Additional structural description of a high level construct can then utilize these basic building blocks in conjunction with spatial operators.

In accordance with the invention, a methodology is provided which describes these "elementary" or "basic" semantic entities through a set of examples. In FIG. 7, examples (images) of rocks 708 and 709 have been used to define a specific rock. However, the set of examples alone may not always be adequate. A classifier 707, which gives a label assignment to the set of the examples, is usually required in order to allow unambiguous generalization from the set of examples and (possibly) counter-examples. Thus, resource discovery may include a structure matching operation 701 and one or more example matching operations. As shown in FIG. 7, example matching operations 702 and 710 may be associated with the respective rock types 705 and 706. These operations, and how they interrelate will be explained in detail below. Thus, FIG. 7 illustrates how the invention can be used in a bigger resource discovery problem where a semantic "concept" needs to be decomposed into smaller and/or finer grain concepts before examples and classifiers can be exchanged in a meaningful way. Consequently, the resource discovery process may involve both correspondence/equivalence matching of low-level concepts (such as shale and sandstone) and structural matching of high-level concepts (shale on top of sandstone).

Figure 8:
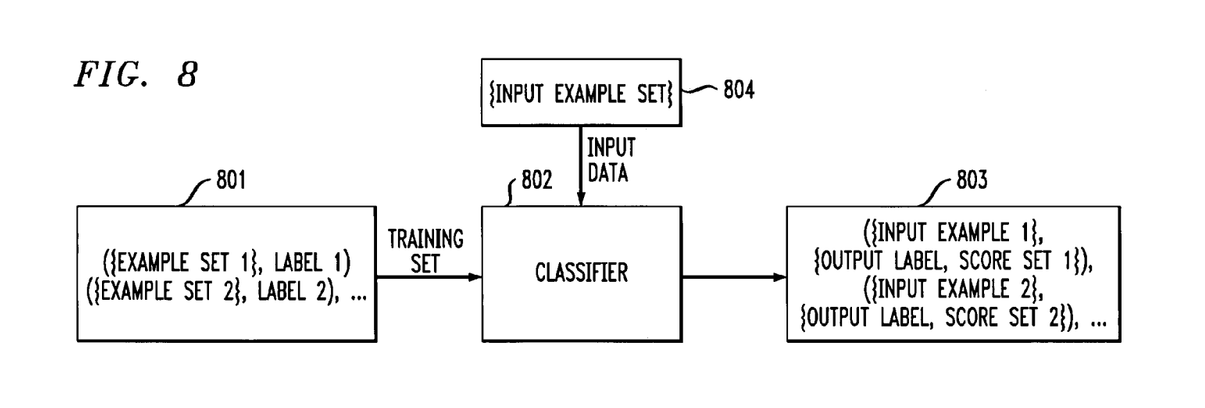
FIG. 8 shows a classification of examples and labels using a classifier trained by a separate training set with separate examples and labels.

Referring now to FIG. 8, an exemplary operation associated with one or more classifiers is depicted. As shown, a classifier 802 is trained by a set of training data 801. The training set may contain sets of examples and their corresponding labels. After the training period has been completed, the classifier is then used on the input example set 804 and generates an output label and score set for each individual input example.

Figure 9:
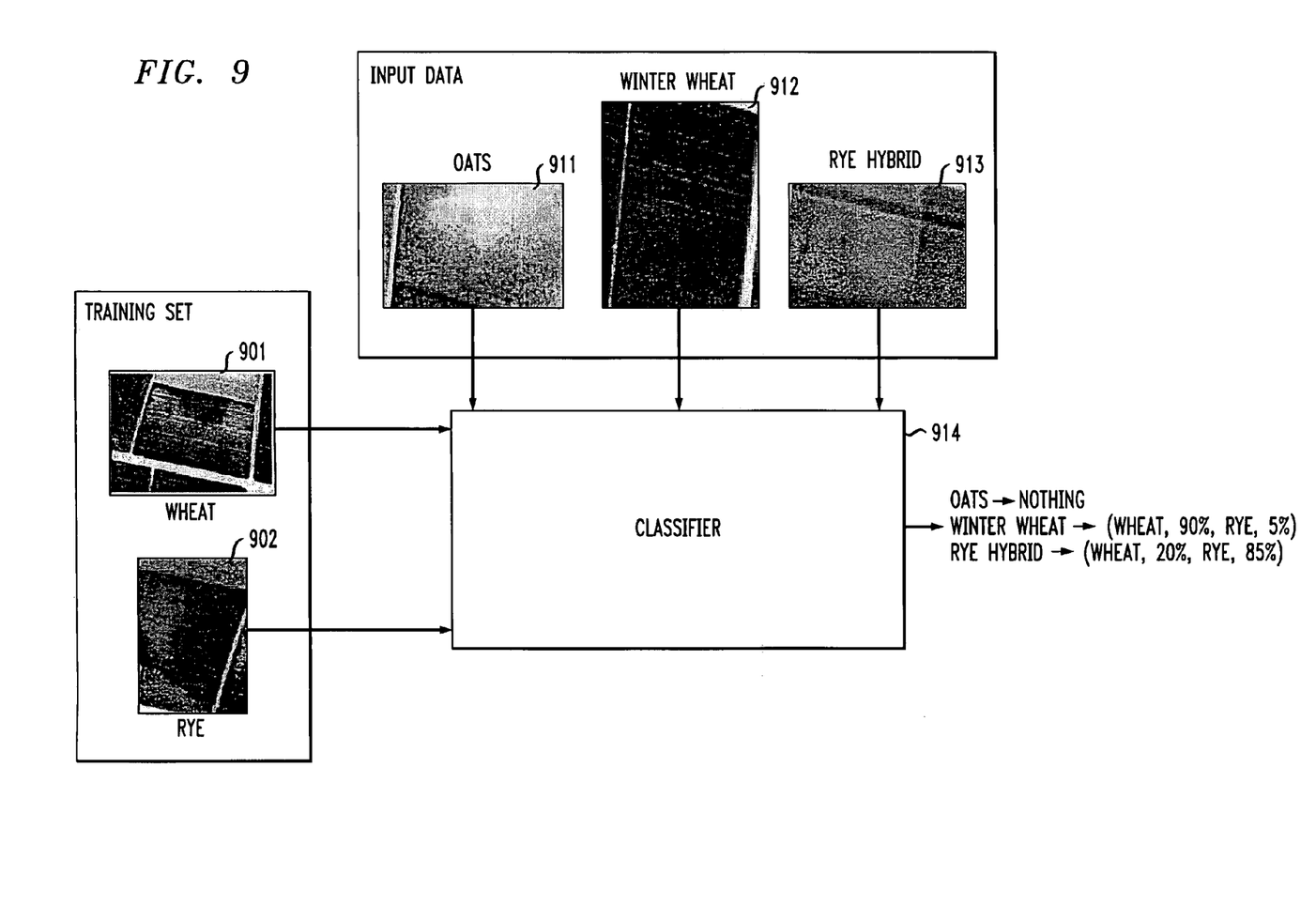
FIG. 9 shows an instance of the process described in FIG. 8.

A specific example of the operation depicted in FIG. 8 is shown in FIG. 9. In this case, the classifier 914 is trained based on the training set comprising examples 901 (wheat) and 902 (rye). Thus, the vocabulary of the training set is wheat and rye. When the classifier operates on the input data, e.g., examples 911 (oats), 912 (winter wheat) and 913 (rye hybrid), each of the input data examples is then assigned a label from the vocabulary defined by the training set, resulting in such results as: (1) oats→nothing (e.g., result associated with input example 911, as none of the labels has more than 1% confidence); (2) winter wheat→wheat with 90% confidence and rye with 5% confidence (e.g., result associated with input example 912); and (3) rye hybrid→wheat with 20% confidence and rye with 85% confidence (e.g., result associated with input example 913).

It is to be noted that the above process may not be sure of the association between two labels. That is, it can only be deduced that rye hybrid can be derived from wheat, but not the other way around. Consequently, the present invention provides a cross-classification operation, as will be explained in detail below, to establish the association between vocabularies.

Figure 10:
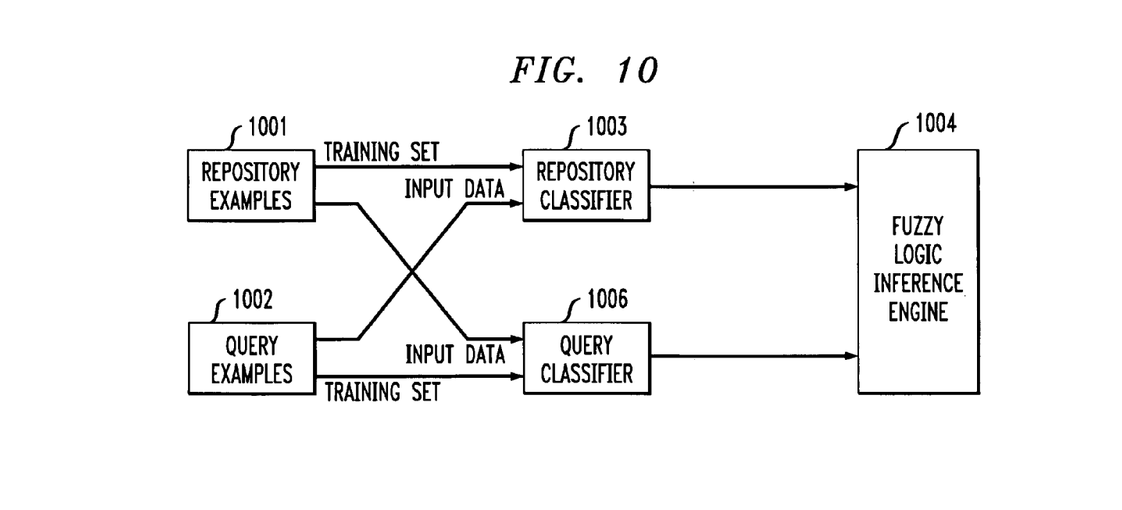
FIG. 10 shows an overall process of mapping the labels of query examples to the labels of repository examples according to an embodiment of the present invention.

Referring now to FIG. 10, a cross-classification process according to the invention is shown. In the process, repository examples 1001 are used as a training set for a repository classifier 1003, while query examples 1002 are used for training a query classifier 1006. The query examples 1002 then serve as the input data for the repository classifier 1003, while the repository examples 1001 serve as the input data for the query classifier 1006. The outputs of the classifiers 1003 and 1006 are then provided to an inference engine 1004, to be described below, which generates association rules.

Figure 11:
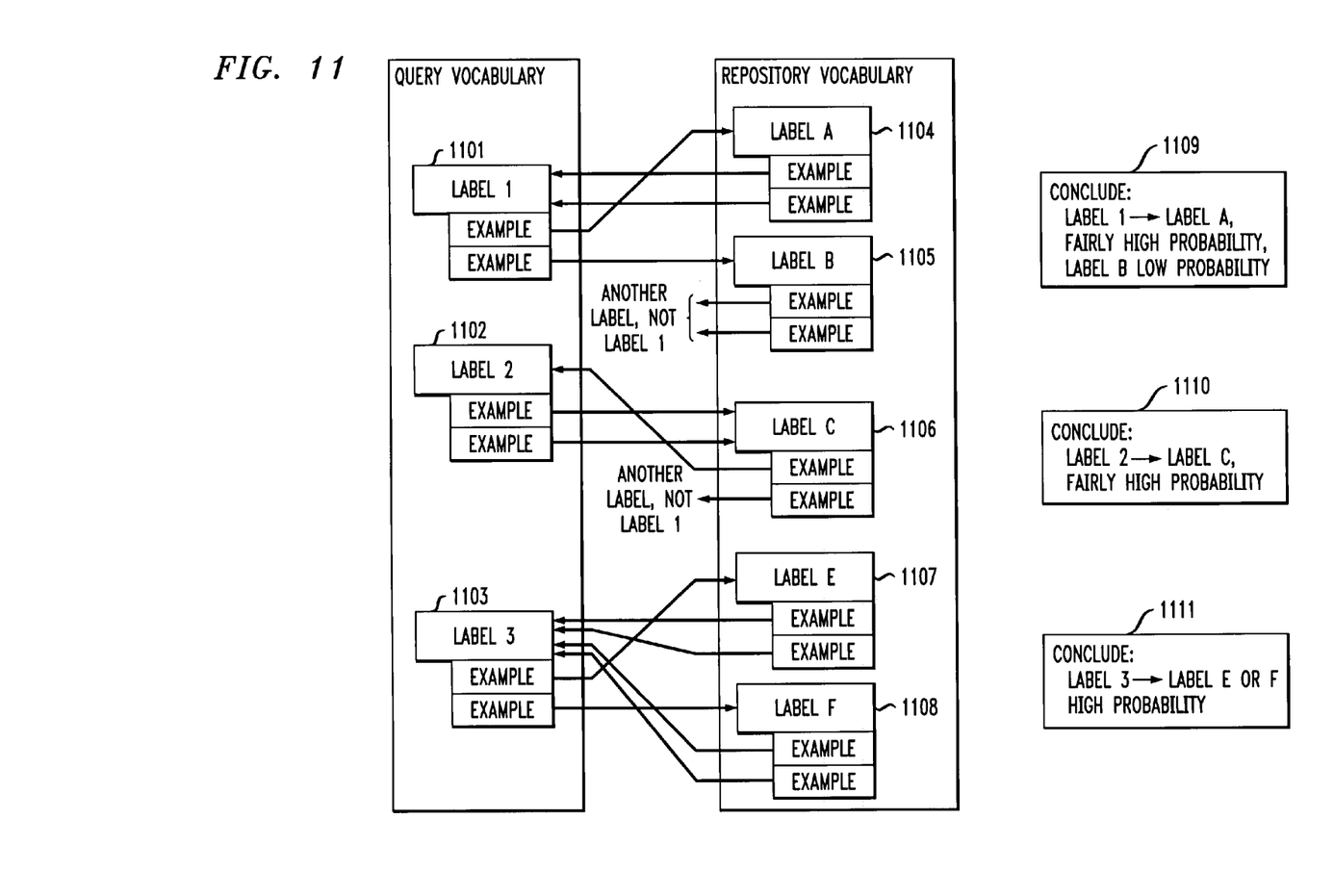
FIG. 11 shows an example of the establishment of mapping rules according to an embodiment of the present invention.

An example of a cross-classification process is shown in FIG. 11. As shown, the labels are divided into query side and repository side. The query side vocabulary comprises three labels: label 1 (1101) has two examples; label 2 (1102) has two examples; and label 3 (1103) also has two examples. The repository side comprises five labels (1104–1108), each of which has two examples. By applying the query classifier on the repository examples, and the repository classifier on the query examples, a linkage is established between the query examples and the repository labels, as well as the repository examples and the query labels. For example, both of the repository examples under label A are classified into label 1 using the query classifier. In contrast, the query examples under label 1 are classified into label A and B, respectively, while the examples of label B are classified into other labels in the query vocabulary. Consequently, from such novel association, it can be deduced (block 1109) that label 1 from the query vocabulary closely matches label A from the repository vocabulary (with a high confidence or probability level). Similar deductions may also be made with respect to other labels as shown in blocks 1110 and 1111.

Figure 12:
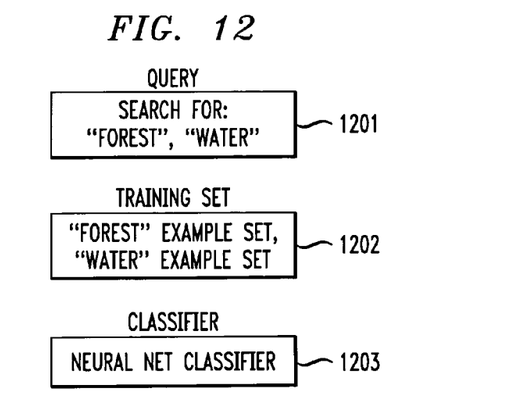
FIG. 12 shows basic building blocks of a resource discovery process according to an embodiment of the present invention.

FIG. 12 illustrates an exemplary structure of a query designed for use with a methodology of the invention. The query has three main components: (1) the query itself (an example is shown in block 1201) comprises the set of labels that are to be retrieved (along with any constraints, or other query parameters), e.g., "forest," and "water;" (2) the training set (an example is shown in block 1202) comprises a set of labeled examples, e.g., "forest" example set and "water" example set; and (3) a classifier (an example is shown in block 1203) used to assign the labels in the training set to input examples, e.g., neural network classifier.

Figure 13:
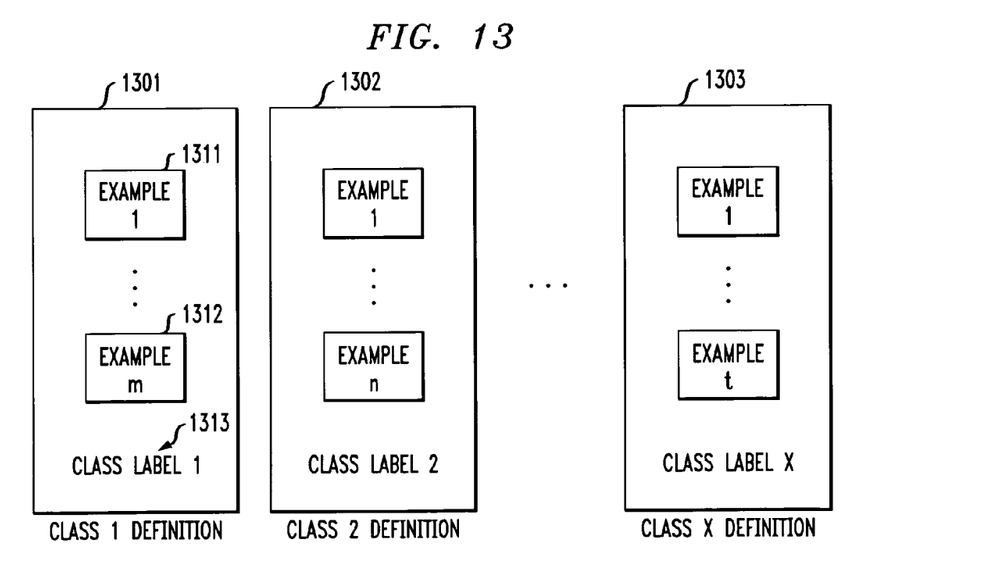
FIG. 13 shows a general scenario according to an embodiment of the present invention in which there are a total of X classes (or labels) in either the query or the repository, and each of which may have multiple examples.

Referring now to FIG. 13, an exemplary structure is shown of a training set for a query or a repository in accordance with the invention. Class definitions are shown in blocks 1301, 1302 and 1303. Each class represents a single semantic type, such as "forest," or "water." Within each class definition is a series of examples considered typical of that class, represented by blocks 1311 and 1312. Examples may be sample images, samples news articles, sets of sample parameter values from a dataset, etc. The class definition also contains a text label 1313, used to identify the class.

Figure 14:
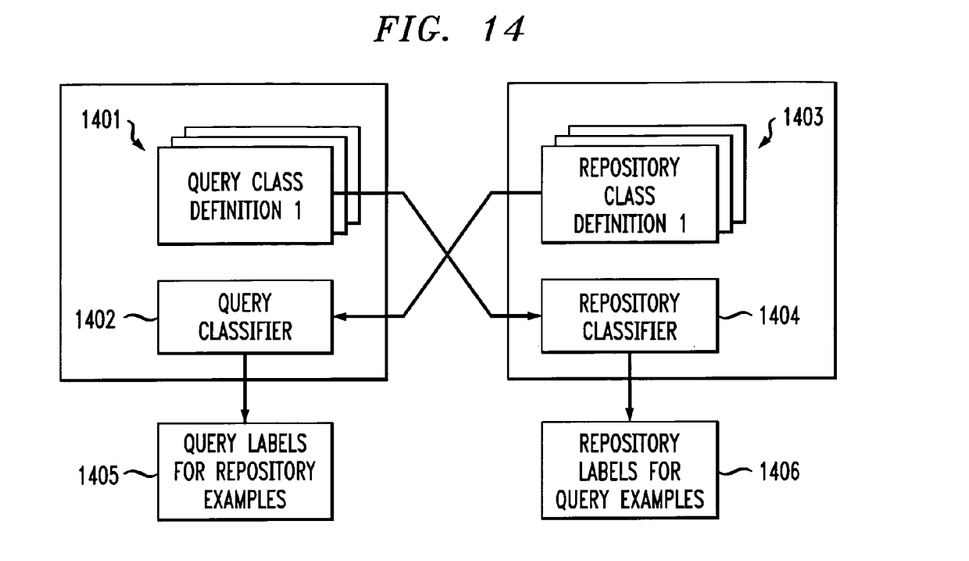
FIG. 14 shows the relationship between the class definitions and the classifier from the query and the repository according to an embodiment of the present invention.

FIG. 14 illustrates a first step in determining the degree of correspondence between a set of requested query entities, and the entity definitions residing in a repository. The examples for each class definition within the query (1401) are presented as input to the trained classifier for the repository (1404). This produces a set of output labels with an optional set of scores (1406), representing the set of labels that the repository classifier assigns to each query example. Similarly, the examples for each class definition with the repository (1403) are presented as input to the trained classifier for the query (1402). The result is a set of labels (possibly with associated scores) (1405) representing the set of labels that the query classifier assigns to each repository example.

Each of these two processes, i.e., providing the training data from one set of entities to the classifier of the other, is referred to as cross-classification. Cross-classification is performed in both directions in order to adequately determine whether the set of labels in the query definitions correspond to those in the repository definitions. To see why this is so, consider simply cross-classifying the query example sets using the repository classifier. This produces a measure of how well each repository class corresponds to a given query class, but produces no measure of specificity for that correspondence. For example, suppose that a set of query examples are provided for the rock type "shale." Also, suppose that one of the classes produced by the trained repository classifier is "rock." The "shale" examples, when provided as input to the repository classifier, will all be assigned output label "rock" with a high degree of confidence. "Rock" is not a good match for "shale," however, since "rock" can also match "sandstone," "limestone," etc. If we are evaluating different repositories for how well they capture the type of entity we are searching for, we want to assign a much higher score to an entity that really is shale, than to the entity "rock." Thus, simply using the query-to-repository cross-classification is inadequate. The way to include a measure of specificity in the scoring procedure is to determine how well the repository class corresponds to the query class; in other words, to do a cross-classification using the repository examples, and the trained query classifier. In the sample problem, the examples for "rock" are likely to contain examples of "sandstone," "limestone," etc., in addition to "shale." When these examples are provided as input to the query classifier, the output label "shale" will have a fairly low value. By combining the high score for query "shale"→repository "rock" with the low score for repository "rock" query "shale," we can obtain an intermediate score, which is what we want. Note that the symbol "→" is used here to represent cross-classification; it can also be read as "implies."

Figure 15:
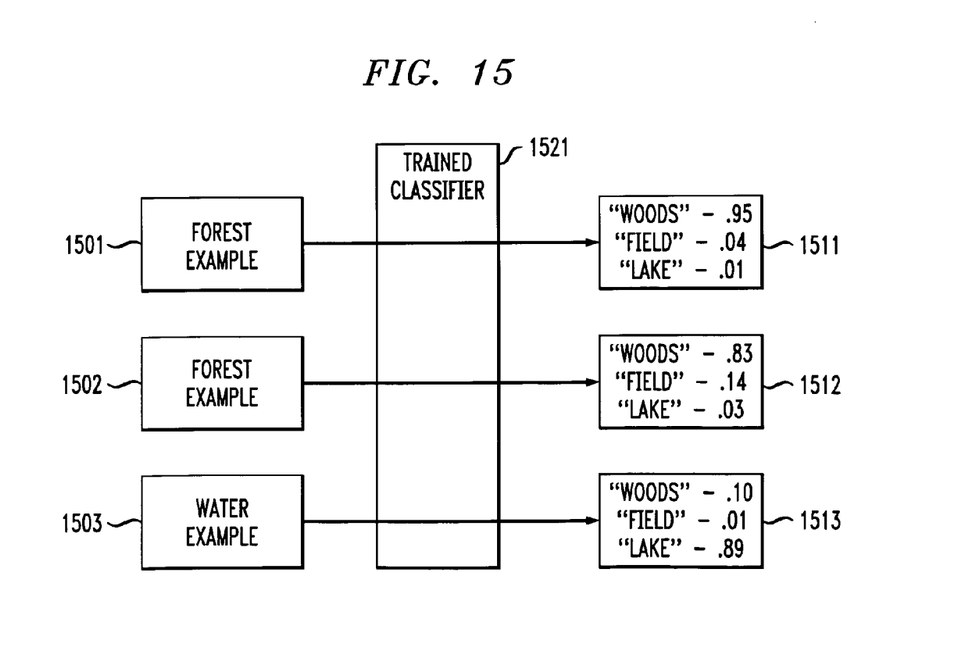
FIG. 15 shows an example mapping from the query labels to repository labels according to an embodiment of the present invention.

FIG. 15 provides an example of one of these cross-classification steps. For this example, we will assume that the input data is from the query examples, and the trained classifier is from the repository. The same description applies for the reverse case, where the input data is from the repository examples, and the trained classifier is from the query. The three blocks on the left hand side of FIG. 15, i.e., 1501, 1502, and 1503, represent the query examples. In this case, we have shown three examples, two of them examples that the query labels as "forest" (1501, 1502), and one that is labeled "water" (1503). These examples are all provided as input to the repository classifier 1521. For each example, the classifier produces a set of repository labels, i.e., 1511, 1512, 1513, with an associated score or confidence level. Note that the scenario illustrated in FIG. 15 is an exemplary case. Some simpler classifiers may produce only a single label with no associated score. Also note that in this example, the scores for each example are summed to one.

Figure 16:
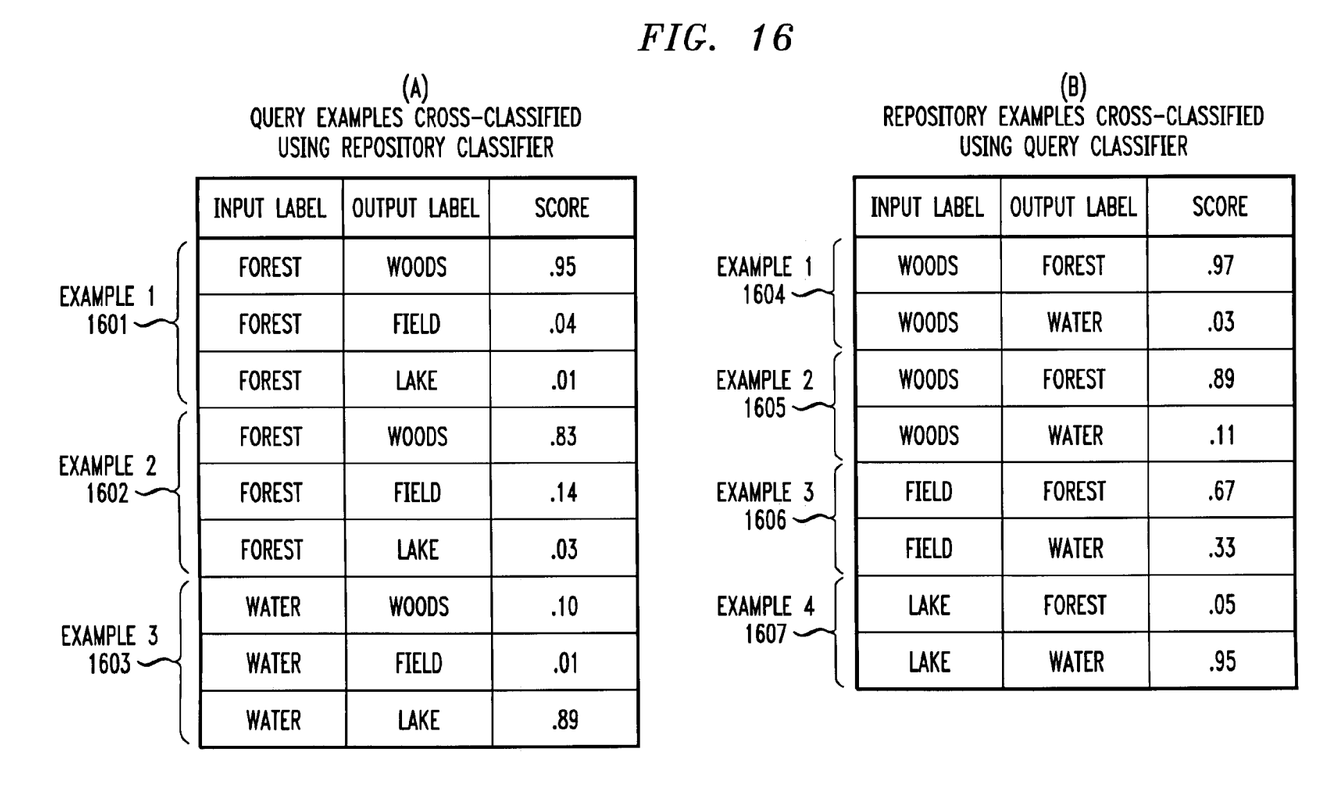
FIG. 16 shows an example of the cross-classification output of the label mapping according to an embodiment of the present invention.

FIG. 16 shows the output records assembled from the example in FIG. 15. The left hand side of FIG. 16 (denoted as (A)) shows the set of output records from labeling the query examples using the repository classifier. The right hand side of FIG. 16 (denoted as (B)) shows the corresponding set of output records from labeling the repository examples using the query classifier. In this case, the repository has two examples for "woods" (1604, 1605), one example for "field" (1606), and one example for "lake" (1607). These examples are then classified using the classifier provided by the query. The output labels correspond to the interpretations of these examples using the vocabulary from the query. As a result, the first example (1604) has a 0.97 score for forest, and a 0.03 score for water. The second example (1605) has a 0.89 score for forest, and a 0.11 score for water. This process is repeated for examples 3 and 4 as well. The query has two examples of forests (1601,1602), and one example of water (1603). Note that all pairwise combinations of query and repository labels are represented at least once in each of the two cross-classification directions.

Figure 17:
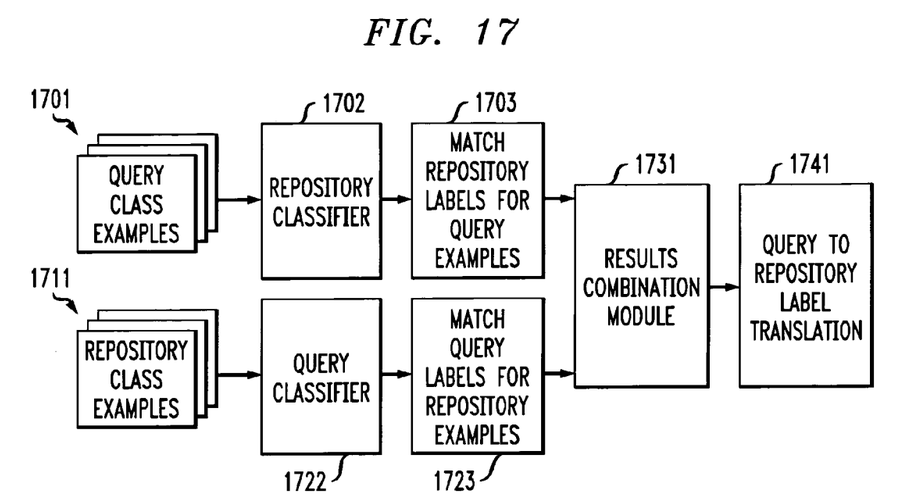
FIG. 17 shows an example of the data flow of the mapping of labels through cross-classification according to an embodiment of the present invention.

FIG. 17 illustrates the data flow of a cross-classification methodology for creating a final result set, in accordance with an embodiment of the invention. As shown, block 1701 contains the set of examples for query classes, which are provided as input to the repository classifier 1702 to produce a set of records 1703 which contains assigned repository labels to each query example. Block 1711 is the set of examples for repository classes, which are provided as input to the query classifier 1722 to produce a set of records 1723 which contains the assigned query labels to each repository example. Both sets of input labels and output labels can be thought of as a set of implications; in other words, another way to read "input label A produces output label B" is "A implies B." The module 1731 is preferably a software module which combines the results from the two cross-classification steps. This combination module may, for example, be a fuzzy logic inference engine or any other suitable algorithm that can combine sets of implications (in both directions, e.g., A implies B, and B implies A) with associated scores, to produce a single set of unique output labels with associated scores for each input label (block 1741).

Figure 18:
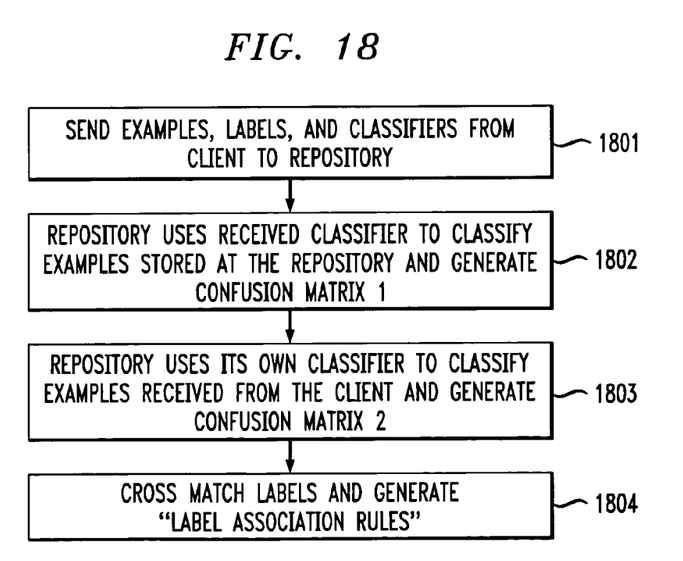
FIG. 18 shows an exemplary flowchart of a cross-classification process according to an embodiment of the present invention.
Figure 20:
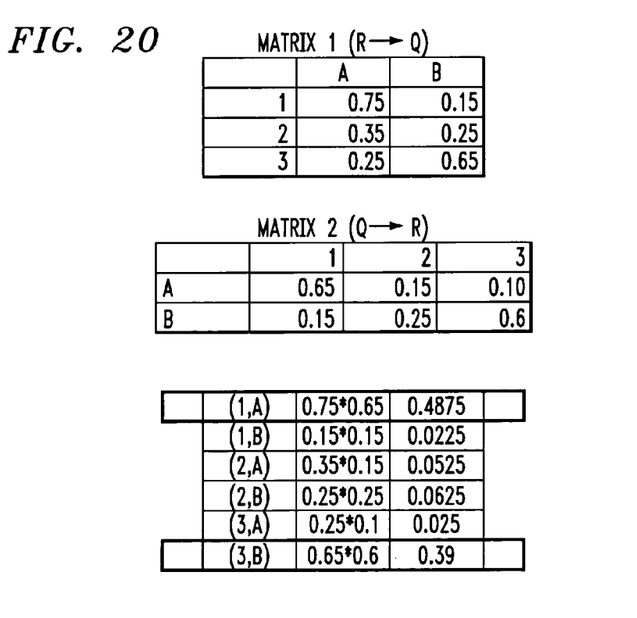
FIG. 20 shows an example of association rule generation and pruning according to an embodiment of the present invention.

FIG. 18 is a flow diagram of a method of generating association rules between the query labels and the repository labels, in accordance with an embodiment of the invention. As shown, the method comprises four steps:

1. Send examples, labels, and classifiers from a client to the repository (step 1801).
2. The repository uses the received classifier to classify the examples stored at the repository and generate matrix 1 (step 1802).
3. The repository also uses its own classifier to classify the examples received from the client and generate matrix 2 (step 1803).
4. Cross match labels and generate label association rules (step 1804). Note that steps 1802 and 1803 in FIG. 18 are interchangeable. An example of matrix 1 and 2 are shown in FIG. 20. Also note that the confidence of cell (i, J) of the matrix (which corresponds to the confidence of classifying label 'i' to label 'J') is the sum of the confidence of classifying the examples of label 'i' to label 'J'.

Figure 19:
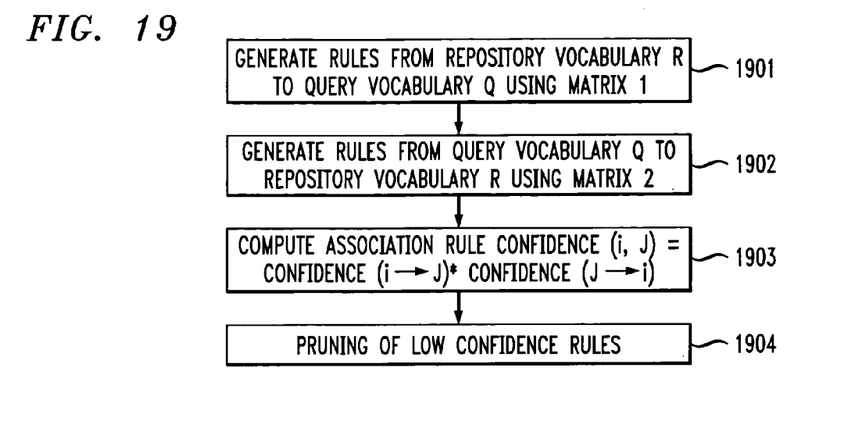
FIG. 19 shows an exemplary flowchart of a process for generating association rules according to an embodiment of the present invention.

FIG. 19 shows the flowchart of a method for generating label association rules, in accordance with an embodiment of the invention. This method corresponds to step 1804 in FIG. 18. The method, as shown in FIG. 19, comprises:

1. Generate rules (and confidence of the rules) to associate labels from repository to labels from query using matrix 1 (step 1901).
2. Generate rules (and confidence of the rules) to associate labels from query to labels from repository using matrix 2 (step 1902).
3. Compute association confidence by using the following formulation:

$$\text{Confidence}(i, J) = \text{Confidence}(i \to J) * \text{Confidence}(J \to i)$$

where the label 'i' is from the one vocabulary, while the label 'J' is from the other vocabulary.

4. Prune (e.g., remove) those association rules which are below a threshold.

FIG. 20 shows an example of matrix 1 and 2 as described above, as well as the example for computing the final association rules. Matrix 1 is computed from classifying repository examples using the classifier sent from the query/client. Matrix 2 is computed from classifying query examples (sent from the client) using the classifier from the repository. Based on the confidence, only the association between label tuple (1,A) and (3,B) are generated.

By applying the inventive methodologies described herein on the IC defect scenario described in FIG. 4, we assume that a set of labeled examples is supplied with a query, in an attempt to obtain similar defects from a repository on a different manufacturing line, which contains historical data about defects and identified causes. The repository would also contain samples of each defect class, but might label defects differently from the query. If classifiers have been trained to produce the defect labels from the examples, the cross-classification methodology of the invention can be used to determine which of the repository defect classes best correspond to each query class.

The present invention also solves the problem described in the news service personalization scenario (shown in FIG. 6). An on-line news clipping service might provide articles that best match a subscriber's interests. Rather than simply specifying a set of keywords for search, a more effective strategy may be for the query to contain information about articles that the user previously found of interest, under the assumption that these will do a good job of capturing the user's future interests. If the user has placed the articles into folders, or otherwise identified a category for each article, these can be used as class labels for the cross-classification methodology of the invention. We assume here that the repository will have its own classification scheme (such as that employed by yahoo, for example), and an automated classifier. The cross-classifier of the invention can be used to determine which of the repository categories best match the user categories, using the example set from the user, and the repository training set.

Note that in this example, the query need not supply a separate classifier. The set of examples and labels supplied with the query can be used to train a copy of the repository's classifier, which then becomes the "query classifier" in the process as described. Also note that the user need not explicitly label his/her categories; all that is required is that examples be provided in different groups. Automatically generated group labels (e.g., labels "aa," "ab," "ac," . . . ) may then be assigned, rather than labels semantically meaningful to human beings, and the cross-classification methodology of the invention applied.

It should be evident from the descriptions of the invention provided herein that the classifier used for the query and for the repository need not come from those respective sources. The classifiers can both come from the query, from the repository, or from a different source altogether. The two classifiers can be the same module, or different modules. All that is required for the methodology of the invention to be applied is the presence of a labeled (explicitly or anonymously) set of training data for both the query and the repository.

Also note, that the term "query" in the descriptions of the invention provided herein need not be supplied from a client or user. A query can be formulated from one repository that seeks to determine corresponding categories in another repository. Thus, this is a general-purpose methodology for unifying the contents of heterogeneous, distributed information archives.

An advantage of the cross-classification methodology of the invention is that the search engine need not search the entire repository for matches to the query. It is sufficient to translate a set of examples for the query and repository categories, and use this information to determine the "best" repository categories. This methodology also allows a query engine to access multiple information repositories, and determine which of the repositories has the "best" information for fulfilling that query. By comparing category scores from multiple sources, we can always combine disparate information, and determine the best choice.

Figure 21:
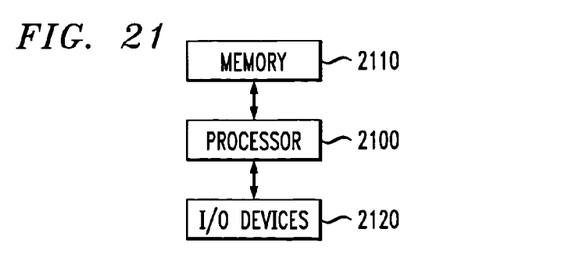
FIG. 21 is a block diagram illustrating a generalized hardware architecture of a computer system suitable for implementing semantic similarity evaluation using cross-classification according to the present invention.

Referring now to FIG. 21, a block diagram is shown illustrating a generalized hardware architecture of a computer system suitable for implementing all or at least a portion of a resource discovery methodology according to the invention as described in detail herein. For example, this generalized hardware architecture may be implemented by a client computer system of a user providing a query to be searched, and/or a computer system(s) on which a repository and/or retrieval engine resides, and/or any other computer system(s) associated with performing resource discovery operations described herein. Such computer systems may be coupled via a suitable network (e.g., Internet, Intranet, etc.). Thus, such a computer system may be used to implement one or more of the various functional components/modules of a resource discovery methodology including cross-classification as depicted in the figures and explained in detail herein. Of course, depending on the search environment within which the invention is employed, it is to be understood that the individual functional components of the semantic similarity evaluation methodology of the invention may be implemented on one such computer system, or on more than one separate such computer system.

By way of example only, a client computer system may provide to a repository computer system, a query including: (1) the query itself comprising the set of labels that are to be retrieved (along with any constraints, or other query parameters) in the requested search; (2) the training set comprising a set of labeled examples; and (3) a classifier used to assign the labels in the training set to input examples. At the repository computer system, which has a trained classifier and a training set, the received query classifier may be trained with the received query training set. Of course, the query classifier may be trained with the query training set at the client computer system or elsewhere prior to being received by the repository. Further, as mentioned above, the classifier may be the same classifier associated with the repository and therefore need not be part of the query. Then, as explained in detail above, cross-classification between the query labels and the repository labels is performed using the trained classifiers resulting in a set of label association rules that identify the optimum repository categories for fulfilling the requested search. If more than one repository is involved, the process may identify the optimum repository for fulfilling the requested search. The search is then fulfilled and results are provided back to the client computer system.

In any case, as shown in FIG. 21, the computer system may be implemented in accordance with a processor 2100, a memory 2110 and I/O devices 2120. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in resource discovery of establishing a semantic correspondence between a first set of labels and a second set of labels, the method comprising the steps of:
    obtaining one or more examples and a classifier for the first set of labels, and one or more examples and a classifier for the second set of labels;
    using the classifier associated with the first set, trained on examples from the first set, to classify the second set thereby generating classification results for the second set of labels, and using the classifier associated with the second set, trained on examples from the second set, to classify the first set thereby generating classification results for the first set of labels; and
    generating label association rules based on the classification results for the first set of labels and the classification results for the second set of labels, a label association rule having a semantic correspondence measure of confidence associated therewith.

2. The method of claim 1, further comprising the step of identifying one or more label association rules, from the label association generated rules, which have a measure of confidence not below a given threshold value.

3. The method of claim 2, wherein the one or more identified label association rules are used in a resource discovery operation associated with a requested search.

4. The method of claim 3, wherein the resource discovery operation is distributed.

5. The method of claim 1, wherein the semantic correspondence measure of confidence for a label from the first set with respect to a label of the second set is a sum of respective confidence measures associated with classification of the one or more examples associated with the sets of labels.

6. The method of claim 1, wherein the label association rules generation step further comprises the steps of:
generating rules associating labels of the first set to labels of the second set;
generating rules associating labels of the second set to labels of the first set; and
computing the semantic correspondence measure of confidence for a label i from one of the sets and a label J from the other of the sets as the product of a semantic correspondence confidence measure associated with the label i implying the label J and a semantic correspondence confidence measure associated with the label J implying the label i.

7. The method of claim 1, wherein classification of labels is supervised.

8. The method of claim 7, wherein supervised classification is performed in accordance with one of a Bayes classification algorithm, a Perceptron classification algorithm, a k-nearest-neighbor classification algorithm, a linear discriminant function classification algorithm, and a neural networks classification algorithm.

9. Apparatus for use in resource discovery of establishing a semantic correspondence between a first set of labels and a second set of labels, the apparatus comprising:
at least one processor operative to: (i) obtain one or more examples and a classifier for the first set of labels, and one or more examples and a classifier for the second set of labels; (ii) use the classifier associated with the first set, trained on examples from the first set, to classify the second set thereby generating classification results for the second set of labels, and use the classifier associated with the second set, trained on examples from the second set, to classify the first set thereby generating classification results for the first set of labels; and (iii) generate label association rules based on the classification results for the first set of labels and the classification results for the second set of labels, a label association rule having a semantic correspondence measure of confidence associated therewith.

10. The apparatus of claim 9, wherein the at least one processor is further operative to identify one or more label association rules, from the label association generated rules, which have a measure of confidence not below a given threshold value.

11. The apparatus of claim 10, wherein the one or more identified label association rules are used in a resource discovery operation associated with a requested search.

12. The apparatus of claim 11, wherein the resource discovery operation is distributed.

13. The apparatus of claim 9, wherein the semantic correspondence measure of confidence for a label from the first set with respect to a label of the second set is a sum of respective confidence measures associated with classification of the one or more examples associated with the sets of labels.

14. The apparatus of claim 9, wherein the label association rules generation operation further comprises: (i) generating rules associating labels of the first set to labels of the second set; (ii) generating rules associating labels of the second set to labels of the first set; and (iii) computing the semantic correspondence measure of confidence for a label i from one of the sets and a label J from the other of the sets as the product of a semantic correspondence confidence measure associated with the label i implying the label J and a semantic correspondence confidence measure associated with the label J implying the label i.

15. The apparatus of claim 9, wherein classification of labels is supervised.

16. The apparatus of claim 15, wherein supervised classification is performed in accordance with one of a Bayes classification algorithm, a Perceptron classification algorithm, a k-nearest-neighbor classification algorithm, a linear discriminant function classification algorithm, and a neural networks classification algorithm.

17. An article of manufacture for use in resource discovery of establishing a semantic correspondence between a first set of labels and a second set of labels, comprising a machine readable medium containing one or more programs which when executed implement the steps of:
obtaining one or more examples and a classifier for the first set of labels, and one or more examples and a classifier for the second set of labels;
using the classifier associated with the first set, trained on examples from the first set, to classify the second set thereby generating classification results for the second set of labels, and using the classifier associated with the second set, trained on examples from the second set, to classify the first set thereby generating classification results for the first set of labels; and
generating label association rules based on the classification results for the first set of labels and the classification results for the second set of labels, a label association rule having a semantic correspondence measure of confidence associated therewith.

18. In a client-server arrangement, a method for use in resource discovery of establishing a semantic correspondence between a first set of labels associated with a query provided at a client device and at least a second set of labels associated with at least one information repository associated with at least one server, the method comprising, at one of the client device and the server, the steps of:
obtaining one or more examples and a classifier for the first set of labels associated with the client query, and one or more examples and a classifier for the second set of labels associated with the information repository;
using the classifier associated with the first set, trained on examples from the first set, to classify the second set thereby generating classification results for the second set of labels, and using the classifier associated with the second set, trained on examples from the second set, to classify the first set thereby generating classification results for the first set of labels; and
generating label association rules based on the classification results for the first set of labels and the classification results for the second set of labels, a label association rule having a semantic correspondence measure of confidence associated therewith.

* * * * *